United States Patent [19]
White, Jr.

[11] 3,892,187
[45] July 1, 1975

[54] RAIL TRACTION VEHICLE

[76] Inventor: Eugene B. White, Jr., 406 Indiana St., Park Forest, Ill. 60466

[22] Filed: Aug. 9, 1974

[21] Appl. No.: 496,259

[52] U.S. Cl. ............................... 105/75; 105/215 C
[51] Int. Cl.² ......................................... B61C 11/00
[58] Field of Search ........... 105/26 R, 75, 96, 215 C

[56] References Cited
UNITED STATES PATENTS

| | | | |
|---|---|---|---|
| 1,937,532 | 12/1933 | Ronk | 105/215 C |
| 2,718,195 | 9/1955 | Bock et al. | 105/90 |
| 2,718,197 | 9/1955 | Bock et al. | 105/215 C |
| 2,896,553 | 7/1959 | Whisler | 105/215 C |
| 3,019,742 | 2/1962 | Kershaw | 105/215 C |
| 3,198,137 | 8/1965 | White, Jr. | 105/215 C |
| 3,232,241 | 2/1966 | White, Jr. | 105/75 |
| 3,399,633 | 9/1968 | Herscovitch | 105/75 X |
| 3,420,191 | 1/1969 | White, Jr. | 105/26 R |
| 3,709,153 | 1/1973 | Herscovitch | 105/26 R |

OTHER PUBLICATIONS

Whiting Corporation, Harvey, Illinois, Trade Bulletins, No. T-142R, (1970), No. T-112R, (1953), No. T-115, No. T-138, (1965), No. T-128R, (1970), No. T-139, (1965), No. T-136, (1967), No. T-143, (1968).

Hugo Aeckerle Cor. – Trade Literature, 2000 Hamburg 66 – Bredenbekstrasse 12, (West-Germany), "The New Series IV Unilock Road/Rail Locomotives."

"The Rational Replacement for Rail-Bound Shunting Locomotives."

"The Unilock System."

*Primary Examiner*—John J. Love
*Attorney, Agent, or Firm*—Lockwood, Dewey, Zickert & Alex

[57] ABSTRACT

A rail traction vehicle for moving railway cars and adapted for transferring weight from a railway car coupled therewith to the traction vehicle. Separate road and rail wheels are provided which selectively and alternatively support the vehicle either wholly on the road wheels or wholly on the rail wheels. A single differential axle is operatively connected in driving relationship with at least one pair of road wheels and with at least two pairs of rail wheels, the respective wheels in each of which pairs of wheels are mounted in opposed relationship to each other on opposite sides of the vehicle.

42 Claims, 5 Drawing Figures

PATENTED JUL 1 1975 3,892,187

SHEET 1

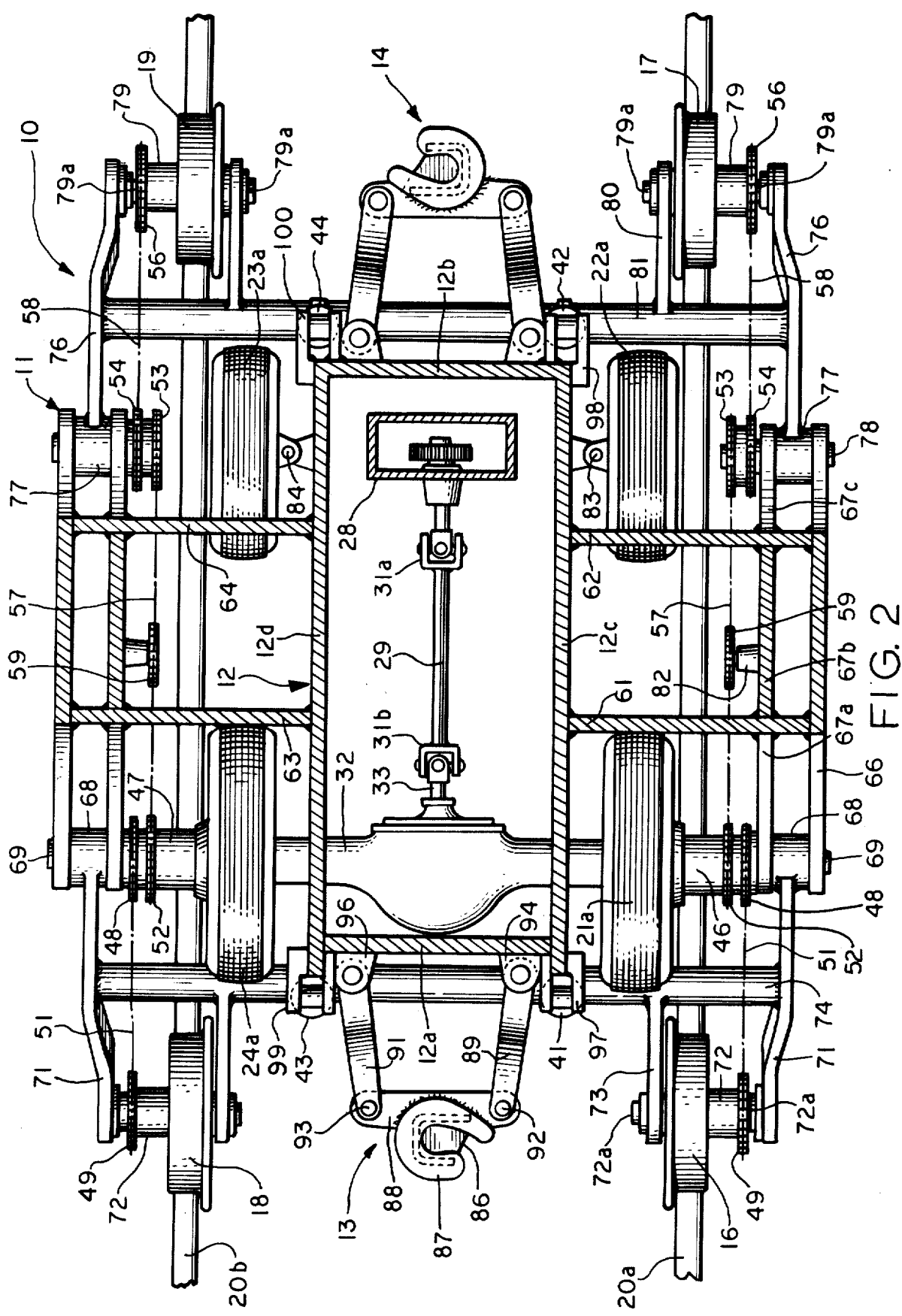

RAIL TRACTION VEHICLE

BACKGROUND AND DESCRIPTION OF THE INVENTION

The present invention generally relates to weight-transfer rail traction railway car moving vehicles, namely, vehicles capable of developing, when coupled to a railway car, a tractive effort greatly in excess of the tractive effort attributable to their own weight through the transfer of weight from a coupled railway car to the traction vehicle. More particularly, this invention is directed to an improved differential and power transmitting system for weight-transfer rail traction vehicles which are adapted for travel on railway tracks and on ground on separate rail and road wheels, respectively. In this regard, an important aspect of the present invention specifically concerns a weight transfer rail traction vehicle having separate road and rail wheels which selectively and alternatively support the vehicle either wholly on road wheels or wholly on rail wheels wherein a single differential axle provides differential drive to at least one pair of road wheels and at least two pairs of rail wheels, the respective wheels in each of which pairs of wheels are mounted in opposed relationship to each other on opposite sides of the traction vehicle.

Heretofore, weight transfer rail traction vehicles capable of traveling on rail and road wheels and adapted for moving railway cars have been characterized by road and rail wheel drive systems which do not include any differential whatsoever, road and rail wheel drive systems wherein differential drive is provided from a single differential to the road wheels only with no differential drive being provided to the rail wheels, road and rail wheel drive systems wherein differential drive is imparted to both road and rail wheels from multiple differentials, and road and rail drive systems wherein while a single differential is used to provide differential drive in road and rail operation modes, the inherent design characteristics of such drive systems have necessitated the use of common wheels for both road and rail operation modes. Until the present invention, no drive system has been provided for a weight-transfer rail traction vehicle having separate road and rail wheels which selectively and alternatively support the vehicle either wholly on the road wheels of wholly on the rail wheels wherein a single differential provides effective differential drive to at least one pair of road wheels and at least two pairs of rail wheels.

Typical of road and rail wheel drive systems which do not include any differential whatsoever are vehicles of the type disclosed in U.S. Pat. Nos. 2,718,197 and 3,420,191 wherein pairs of rail wheels, interconnected by solid axles, are chain driven by a power train which does not include a differential. Similarly, the absence of a differential in the road wheel drive system is compensated for by the use of a single powered road wheel or closely spaced multiple road wheels which adversely affect vehicle stability and limit vehicle weight. While these road and rail wheel drive systems provide acceptable performance in relatively light weight rail traction vehicles, inherent wheel slippage, stresses, as well as other inefficiencies and problems prevent these drive systems from being commercially practical in heavier vehicles and more demanding service.

Road and rail wheel drive systems wherein differential drive is provided from a single differential to the road wheels only with no differential drive provided to the rigidly connected rail wheels is typified by Whiting Corporation "Trackmobile" models 3TM, 5TM and 6TM. These drive systems while being acceptable for somewhat heavier vehicles and being capable of more demanding service than vehicles of the type disclosed in the above-mentioned U.S. Pat. Nos. 2,718,197 and 3,420,191, still experience inherent rail wheel slippage, stresses and related problems which make their application to larger and more powerful rail traction vehicles of questionable desirability.

Efforts to overcome the disadvantages of the above-described drive systems have involved the use of multiple differentials. For example, U.S. Pat. No. 3,232,241 describes a drive system wherein relatively large rail traction vehicles are provided with differential drive to separate road and rail wheels from two separate differentials. Accordingly, these drive systems have necessitated the use of more components than are otherwise necessary, as demonstrated by the system of the present invention.

More recently, a road and rail drive system for rail traction vehicles has been developed which affords, from a single differential, differential drive in road and rail operation modes. This system, fully disclosed in U.S. Pat. No. 3,399,633, however, is characterized by a number of very significant disadvantages and objections. In particular, in this drive system the powered wheels must commonly function in road and rail operation modes resulting in the vehicle itself having more limited application and other serious drawbacks than the previously described multiple differential vehicle. For example, vehicles incorporating this drive system are characterized by a single coupler at one end of the vehicle only, while it is known that couplers at opposite ends of the vehicle would be beneficial. Similarly, vehicles incorporating these drive systems are characterized by the use of steerable road wheel assemblies adjacent the center of one end of these vehicles, thereby severely affecting the order of stability achieveable with this drive design and adversely limiting the size, weight and drawbar pull of these traction vehicles. In addition, the necessity of employing common wheels for road and rail service has effectively precluded the use of pneumatic road tires of relatively large and more desirable size, thereby severely limiting the vehicle's ground clearance, ability to clear and climb road obstacles, and shock absorbing capabilities. Also, frame requirements in vehicles incorporating these drives make relatively easy gage convertibility, that is, adaptability of the vehicle to accommodate multiple railway gages, without frame modification, virtually impossible.

The present invention overcomes the above-described disadvantages of heretofore known road and rail wheel traction vehicle drive systems by providing a weight transfer rail traction vehicle having separate road and rail wheels which selectively and alternatively support such vehicle either wholly on the road wheels or wholly on the rail wheels and wherein a single differential provides differential drive to at least one pair of road wheels and at least two pairs of rail wheels, the respective wheels in each of which pairs are mounted in opposed relationship to each other on opposite sides of the traction vehicle. In a preferred embodiment of the present invention, the vehicle is supported either wholly on road wheels, at least two pair of which are mounted on the vehicle in generally rectangular configuration, or wholly on rail wheels, also at least two pairs of which are mounted on the vehicle in generally rectangular configuration. A single differential is driven by an engine and provided with opposed power output shafts which extend therefrom to opposite sides of the vehicle, chain drive systems powered by these output shafts are also provided, and the output shafts and chain drive systems are drivably connected to at least two pairs of rail wheels and one pair of road wheels, the respective wheels in each of which pairs of wheels are mounted in opposed relationship to each other on opposite sides of the traction vehicle.

It is, therefore, a general object of the present invention to provide an improved weight transfer rail traction railway car moving vehicle.

Another object of the present invention is to provide an improved differential and power transmitting system for weight transfer rail traction vehicles which are adapted for travel on railway tracks on a set of four rail wheels and on ground on a separate set of four road wheels, respectively.

Another object of the present invention is to provide an improved weight transfer rail traction vehicle having separate road and rail wheels which selectively and alternatively support the vehicle either wholly on road wheels or wholly on rail wheels and wherein only a single differential provides differential drive to at least one pair of road wheels and at least one pair of rail wheels, the respective wheels in each of which pairs of wheels are mounted in opposed relationship to each other on opposite sides of the traction vehicle.

Another object of the present invention is to provide an improved weight transfer rail traction railway car moving vehicle which includes a single differential axle for providing differential drive to at least one pair of road wheels and at least two pairs of rail wheels wherein the rail wheels have track engaging surfaces entirely formed of metal and the road wheels include tires of resilient rubber-like material.

Another object of the present invention is to provide an improved weight transfer rail traction vehicle wherein differential drive is transmitted to separate sets of road and rail wheels from a single differential system which permits the use of large, resilient road wheels mounted to the vehicle in generally rectangular configuration to provide the vehicle with greater stability, improved ground clearance and the ability to clear and climb road obstacles, as well as improved shock absorbing capabilities.

Another object of the present invention is to provide a relatively inexpensive weight transfer rail traction vehicle of relatively large size, weight and high drawbar pull.

Another object of the present invention is to provide an improved weight transfer rail traction vehicle having an improved road and rail drive system wherein differential drive is provided to both the driven road and rail wheels from a single differential and wherein the use of double couplers, that is, couplers at each end of the vehicle, can be accommodated.

Another object of the present invention is to provide an improved weight transfer rail traction vehicle which is characterized by relatively easy gage convertibility, enabling a single sized main frame, without modification thereof, to accommodate multiple railway track gages, for example, railway track gages of from 36 to 66 inches.

Another object of the present invention is to provide an improved railway traction vehicle which includes a novel differential axle and power transmitting system which includes a single differential and associated chain drive means for providing differential drive to separate sets of road and rail wheels, which separate sets of road and rail wheels selectively and alternatively support the vehicle so that such vehicle can be supported either wholly on the road wheels or wholly on the rail wheels.

These and other objects of the present invention will be apparent from the following detailed description of a preferred embodiment, taken in conjunction with the accompanying drawings wherein:

FIG. 2 is a plan sectional view of the traction vehicle shown in FIG. 1 taken along the lines 2—2 of FIG. 1.

Figure 1:
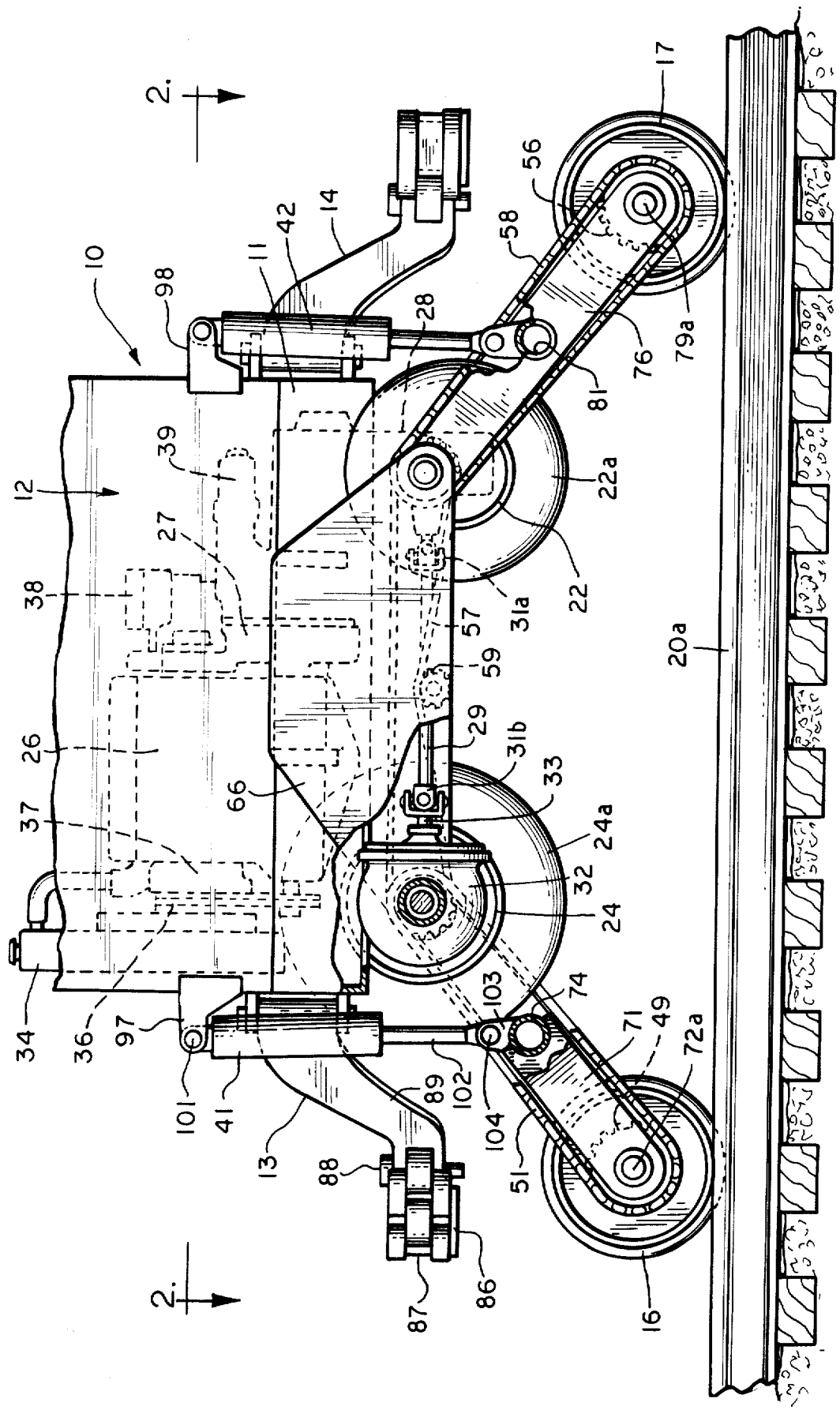
FIG. 1 is a side elevational schematic view of a traction vehicle embodying the present invention partially in section, with portions thereof broken away and with certain components shown in phantom.

Referring to FIGS. 1 and 2, a weight transfer rail traction railway car moving vehicle embodying principles of the present invention is generally designated by the reference numeral 10 and includes a frame 11 having a main frame section 12 which includes opposed end sections 12a and 12b to which coupler assemblies 13 and 14, respectively, are fixed. In the illustrated embodiment, traction vehicle 10 is provided with four rectangularly oriented metal rail wheels 16, 17, 18 and 19 which are pivotally mounted for movement to a lowered position, as shown, wholly supporting the vehicle 10 on railway tracks 20a and 20b. As will be more fully explained hereinafter, vehicle 10 also can be selectively and alternatively wholly supported by four rectangularly oriented road wheels 21, 22, 23 and 24 which are fixed with respect to the frame 11. These road wheels respectively include four relatively large resilient tires 21a, 22a, 23a and 24a of rubber or rubber-like material that can be of pneumatic or other suitable construction, so as to provide the vehicle in road wheel mode operation with greater stability, high ground clearance and the ability to clear and climb road obstacles as well as improved shock absorbing capabilities, particularly when compared to prior art vehicles of the type shown in the previously referred to U.S. Pat. No. 3,399,633. As an alternative to the described embodiment, the traction vehicle of the present invention may be provided with rail wheels fixed to the frame and pivotally mounted or retractable road wheels.

A power train for supplying power to the road and rail wheels is provided by an engine 26 having an output shaft which connects to a fly wheel (not shown) enclosed within a bell housing 27 having power input connection into a transmission 28. An output or drive shaft 29, which includes a pair of universal joints 31a and 31b, is connected to a differential power input shaft 33 which, in turn, is connected to a differential axle 32. Auxiliary components associated with the power train include an engine radiator 34, associated drive belts 36 and a radiator fan housing 37. The engine also serves to provide power to an air compressor 38 which can be used to drive an air horn and sand discharging apparatus (not shown). Engine 26 also serves to drive a hydraulic pump 39 which, as will be explained more fully hereinafter, is used in the illustrated embodiment to operate four hydraulic cylinders 41, 42, 43 and 44 which provide power for selectively raising and lowering the rail wheels 16, 17, 18 and 19.

In accordance with an important aspect of the present invention, the differential axle 32 is mounted on the main frame 12 and encloses a differential of known design and opposed out shafts which extend laterally outwardly therefrom terminating exteriorly of side members 12c and 12d of the main frame 12. These opposed output shafts in the differential axle 32 are drivably connected to power spindles 46 and 47 for providing power transmission to road wheels 21 and 24 and each of the rail wheels 16–19. In the illustrated embodiment, the spindles 46 and 47 have chain drive means operatively connected therewith. For example, spindle 46 includes an outer drive sprocket 48 which drives a driven rail sprocket 49 by means of a chain 51 to provide power to the rail wheel 16. Similarly, spindle 46 also includes an inner drive sprocket 52 which drives an inner sprocket 53 mounted in ganged relationship with an outer sprocket 54 for supplying power to the rail wheel 17 through chains 57 and 58. Chain length adjustments can be effected through the use of a take up sprocket 59 or equivalent known techniques. Spindle 47 is powered and driven by the opposed output shaft in differential axle 32 and drives the respective rail wheels 18 and 19 in a similar fashion and, accordingly, identical reference numerals have been used to designate corresponding chain drive components which are driven by the spindle 47.

As best shown in FIG. 2, the main frame section 12 of frame 11 is of generally rectangular construction and includes two opposed side members 12c and 12d which extend in a fore and aft direction generally transverse to the axis of differential axle 32 and the respective axes of rail wheel pairs 16–18 and 17–19 which are parallel to the axle 32. In this regard, it should be noted that the main frame 12 is constructed and disposed so that it will not interfere with relocation of the rail wheels 16, 17, 18 and 19, thereby enabling a single frame to be used with rail wheels spaced for a full range of rail gages, preferably rail gages of from 36 to 66 inches, thereby providing the traction vehicle 10 with relatively easy gage convertibility without frame modification.

Frame 11 also includes frame members 61 and 62 which are fixed to main frame side member 12c and extend laterally and outwardly therefrom, and frame members 63 and 64 which are likewise fixed to main frame side member 12d and extend laterally and outwardly therefrom. Outer frame side member 66 is fixed to the outer terminal portions of side members 61 and 62 and, together with inner side frame members 67a–c, defines separate vertical side openings which provide support locations for pivot and drive components. For example, outer frame side member 66 and inner frame side member 67a rotatably support a pivot sleeve 68 which rotates about a fixed pivot pin 69 and, to which, a pivot arm 71 is fixed. In the illustrated embodiment, a stub axle 72a is supported by, and mounted between, the outer end of pivot arm 71 and a support arm 73 which, in turn, is fixed to a transverse rail wheel assembly support member 74. A cylindrical sleeve 72, to which driven rail wheel sprocket 49 and rail wheel 16 are corotatably fixed, is rotatably mounted on the stub axle 72 a with suitable bearings of conventional design being provided. On the same side and adjacent the opposite end of the vehicle, a pivot arm 76 is fixed to a rotatable pivot sleeve 77 for pivotal movement about a pivot pin 78 which is fixed between outer side frame member 66 and inner side frame member 67c. Pivot pin 78 also rotatably supports the ganged rollers 53 and 54 which, as previously noted, cooperate with drive sprocket 52 and chains 57 and 58 for the transmission of power from differential axle 32 to rail wheel 17. A stub axle 79a is supported by, and mounted between, the outer end of pivot arm 76 and a support arm 80 which, in turn, is fixed to a transverse rail wheel assembly support member 81. A cylindrical sleeve 79, to which driven rail wheel sprocket 56 and rail wheel 17 are corotatably fixed, is rotatably mounted on the stub axle 79a with suitable bearings of conventional design being provided. In this embodiment, take up sprocket 59 is rotatably supported within a sprocket support arm 82 which, in turn, is fixed to inner frame member 67b. It will be appreciated that the opposite side of the vehicle 10 in the illustrated embodiment is of similar design and, accordingly, specific description of the supports for rail wheels 18 and 19 and their associated stub axles is not deemed necessary.

As best shown in FIG. 2, road wheels 22 and 23 are mounted on steering gear of known design which is partially schematically shown and generally designated by the reference numerals 83 and 84 which are respectively fixed to frame side members 12c and 12d.

An important aspect of the single differential drive system of the present invention is that it permits the mounting of at least four road wheels to the vehicle to impart thereto improved stability while, at the same time, permitting the use of two couplers 13 and 14, respectively mounted at opposite ends of the vehicle. These couplers can be of known type adapted to provide coupling of the traction vehicle to railway cars equipped with standard AAR contoured couplers, hook and buffer coupler arrangements, or others, as desired. In the illustrated embodiment, the coupler 13 includes a lifting plate 86 and coupler head 87 which are fixed to a support arm 88 mounted to the outer ends of a pair of links 89, 91 by pivot pins 92, 93, respectively. The opposite ends of links 89, 91 are pivotably mounted to ear plates 94, 96 which, in turn, are fixed to the frame 11.

Raising and lowering of the rail wheels is accomplished by operation of the hydraulic cylinders 41, 42, 43 and 44 which are respectively secured to support ears 97, 98, 99 and 100 which, in turn, are mounted to each of the corners of the generally rectangular main frame section 12. As best shown in FIG. 1, the stationary end of cylinder 41 is pivotally mounted to support ear 97 by a pin 101. The hydraulic cylinder piston rod 102 is arranged for reciprocal movement within the cylinder 41 and has one end thereof fixedly secured to a connection ear 103 upwardly extending from transverse member 74 by means of a pivot pin connection 104. It will be appreciated that hydraulic cylinder 43 is similarly mounted to transverse member 74 and that each of cylinders 42 and 44 is correspondingly mounted to transverse member 81. In this manner, actuation of the piston rod 102 in cylinder 41 and the piston rod in cylinder 43 will result in transverse member 74 being arcuately moved about the axis defined by pin 69 for raising and lowering of rail wheels 16 and 17. Correspondingly, actuation of cylinders 42 and 44 will serve to arcuately move transverse member 81 about the axis of pin 78 for respectively raising and lowering the rail wheels 17 and 19 at the opposite end of the vehicle.

Figure 3A:
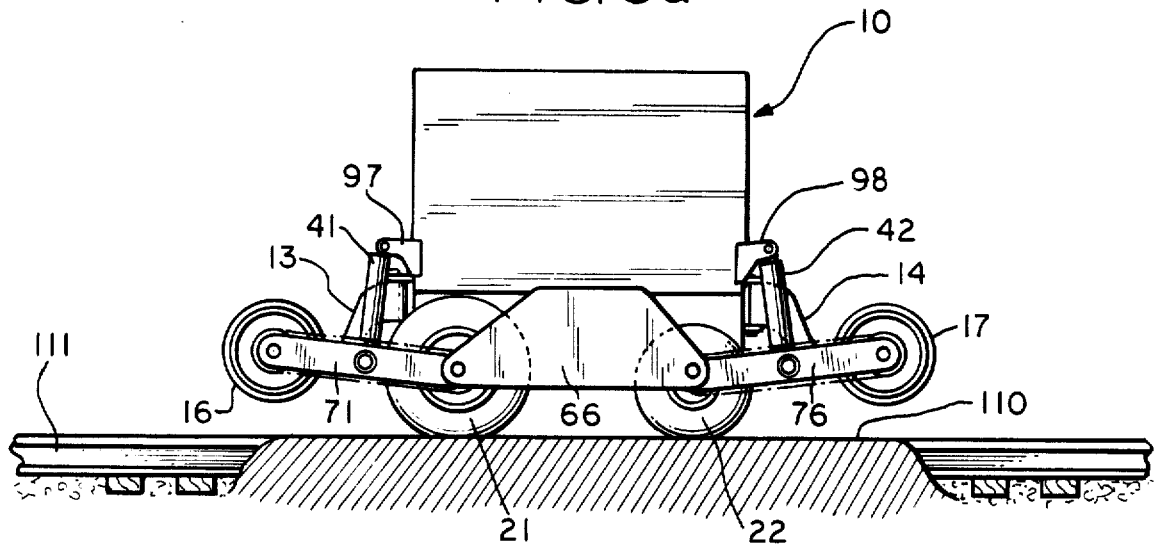
FIGS. 3a–c schematically depict in sequence, a rail traction vehicle of the present invention in operation.
Figure 3B:
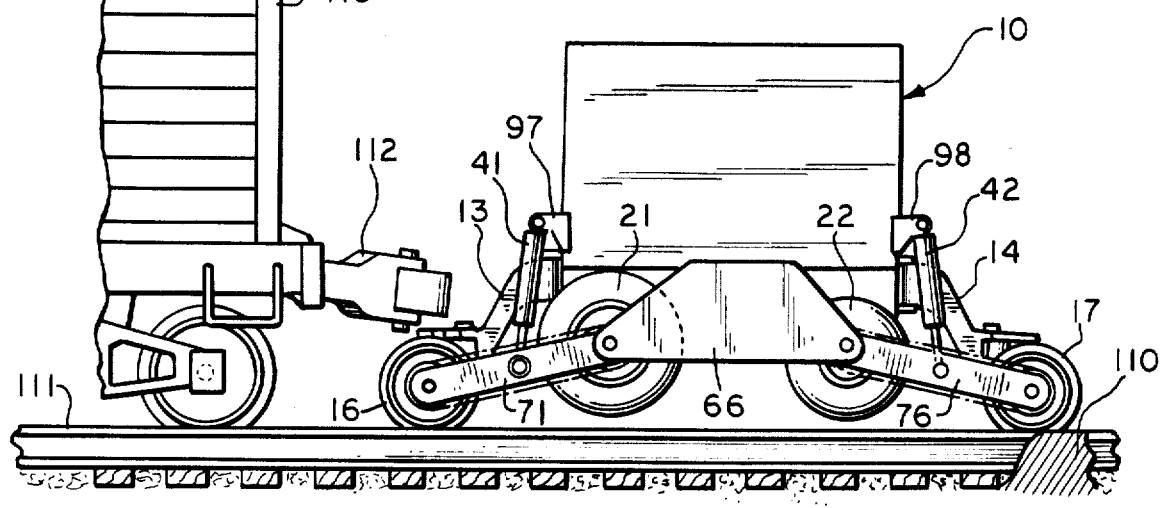
Figure 3C:
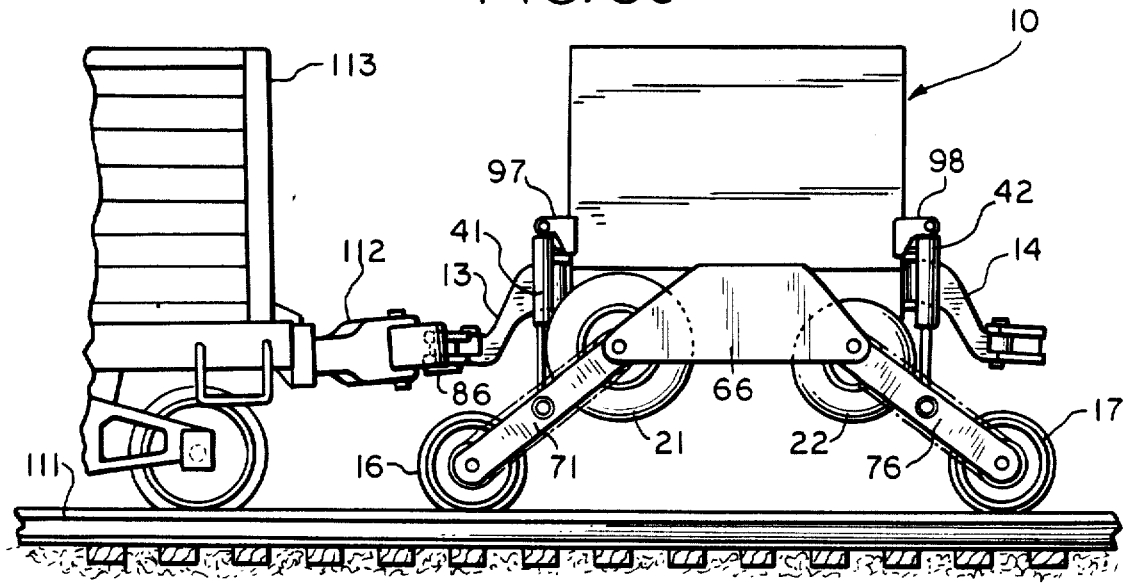

The operation of the vehicle will now be described in conjunction with the sequence depicted by FIGS. 3a–c. As shown, the vehicle 10 is driven on its road wheels to a suitable location, such as, for example, a railway crossing, 110 for mounting onto rail tracks 111. The driver of the vehicle aligns the vehicle so that rail wheels 16, 17, 18 and 19 are in appropriate alignment with the rails 111, actuates hydraulic cylinders 41–44 to lower the rail wheels 16–19 for supporting the vehicle 10 on the rail wheels only, and then drives the vehicle on the railway tracks to a desired location. In view of the fact that in the illustrated embodiment the coupler assemblies 13 and 14 are fixed to the frame of the vehicle 10, it is necessary that the pivot arms 71 and 76 be lowered to an extent such that the coupler 13 will be sufficiently low for positioning in underlying relationship with a coupler 112 on a railway car 113, as shown in FIG. 3b, to permit coupling engagement therewith. As soon as appropriate alignment of couplers 13 and 112 on the vehicle 10 and railway car 113, respectively, is achieved, hydraulic cylinders 41–44 are activated to cause the pivot arms 71 and 76 to respectively pivot in counterclockwise and clockwise directions about the pivot pins 69 and 78. In this manner, lifting plate 96 on coupler assembly 13 serves to engage railway car coupler 112 resulting in a lifting action on the railway car 113 and a transfer of a portion of the weight from the railway car to the traction vehicle 110 thereby producing a tractive effort greatly in excess of the tractive effort attributable to the weight of the traction vehicle alone and enabling the traction vehicle 10 to have a correspondingly increased drawbar pull. While not shown in the illustrated embodiment, the vehicle couplers can be provided with means for the lifting thereof, for example, a hydraulic ram, to provide relative movement of the coupler with respect to the vehicle frame as is generally shown in U.S. Pat. No. 3,420,191.

It will be apparent to those skilled in this art that the present invention can be embodied in various forms of traction vehicles. Accordingly, this invention is to be construed and limited only by the scope of the appended claims.

I claim:

1. A rail traction vehicle of the type adapted for transferring weight from a coupled railway car to the traction vehicle comprising: a main frame having opposed side members, at least two pairs of road wheels mounted on said vehicle in generally rectangular configuration along axes generally transverse to said side members, at least two pairs of flanged rail wheels also mounted on said vehicle in generally rectangular configuration along axes generally parallel to but spaced from said road wheel axes, means for selectively and alternatively supporting said vehicle either wholly on the road wheels or wholly on the rail wheels, a single differential axle on the vehicle generally parallel to the axes of the road and rail wheels, a power train including an engine for driving said single differential axle, and power transmitting means interconnecting the differential axle in driving relationship with said wheels for driving said two pairs of rail wheels and one pair of road wheels, whereby the driven wheels on one side of the traction vehicle are differentially driven with respect to the driven wheels on the opposite side of said vehicle.

2. The vehicle defined in claim 1 wherein two weight transfer couplers are mounted on opposite ends of said vehicle.

3. The vehicle defined in claim 1 wherein said rail wheels have rail track engaging surfaces which are entirely formed of metal and the road wheels include tires of resilient rubber-like material.

4. The vehicle of claim 1 wherein said means for selectively and alternatively supporting said vehicle either wholly on the road wheels or wholly on the rail wheels comprises pivot arms to which either said road wheels or rail wheels are mounted.

5. The vehicle of claim 4 wherein at least two of said pivot arms are each mounted to opposite sides of said vehicle in spaced apart relationship from each other.

6. The vehicle of claim 1 wherein one pair of said two pairs of rail wheels is mounted adjacent one end of said vehicle and the other pair of said two pairs of rail wheels is mounted adjacent the opposite end of said vehicle, and said two pairs of road wheels are mounted to said vehicle between said two pairs of rail wheels.

7. The vehicle of claim 6 wherein two weight transfer couplers are mounted on opposite ends of said vehicle.

8. The vehicle of claim 1 wherein said rail wheels are mounted laterally exteriorally of said side members of said frame.

9. The vehicle of claim 1 wherein said rail wheels are mounted on stub axles.

10. The vehicle of claim 1 wherein each of said pairs of rail wheels is respectively mounted on said vehicle in spaced relation from said main frame, said main frame being arranged and positioned to permit relocation of the respective rail wheels in each of said pairs of rail wheels to accommodate railway track gages of from 36 inches to 66 inches without necessitating structural modification of said main frame.

11. The vehicle of claim 1 wherein said power transmitting means includes a chain drive.

12. A rail traction vehicle of the type adapted for transferring weight from a coupled railway car to the traction vehicle comprising: a main frame, a plurality of road wheels mounted on said vehicle, at least one pair of said road wheels being mounted along an axis which generally traverses said vehicle with the road wheels in said pair of road wheels being mounted in opposed relationship to each other on opposite sides of said vehicle, at least two pairs of flanged rail wheels also mounted on said vehicle along axes which are generally parallel to each other and with the rail wheels in each of said pairs of flanged rail wheels also being mounted in opposed relationship to each other on opposite sides of said vehicle, means for selectively and alternatively supporting said vehicle either wholly on said road wheels or wholly on said rail wheels, a single differential axle on the vehicle, a power train including an engine for driving said single differential axle, and power transmitting means interconnecting said differential axle in driving relationship with said two pairs of rail wheels and said one pair of road wheels, whereby the respective opposed road and rail wheels in said pairs of wheels are differentially driven with respect to each other.

13. The vehicle defined in claim 12 wherein two weight transfer couplers are mounted on opposite ends of said vehicle.

14. The vehicle defined in claim 12 wherein said rail wheels have rail track engaging surfaces which are entirely formed of metal and the road wheels include tires of resilient rubber-like material.

15. The vehicle of claim 12 wherein said means for selectively and alternatively supporting said vehicle either wholly on the road wheels or wholly on the rail wheels comprises pivot arms to which either said road wheels or rail wheels are mounted.

16. The vehicle of claim 15 wherein at least two of said pivot arms are each mounted to opposite sides of said vehicle in spaced apart relationship from each other.

17. The vehicle of claim 12 wherein one pair of said two pairs of rail wheels is mounted adjacent one end of said vehicle and the other pair of said two pairs of rail wheels is mounted adjacent the opposite end of said vehicle, and said two pairs of road wheels are both mounted to said vehicle between said two pairs of rail wheels.

18. The vehicle of claim 17 wherein two weight transfer couplers are mounted on opposite ends of said vehicle.

19. The vehicle of claim 12 wherein said rail wheels are mounted laterally exteriorly of said side members of said frame.

20. The vehicle of claim 12 wherein said rail wheels are mounted on stub axles.

21. The vehicle of claim 12 wherein each of said rail wheels is mounted on a stub axle and each of said pairs of rail wheels is respectively mounted on said vehicle in spaced relation from said main frame, said main frame being arranged and positioned to permit relocation of the respective rail wheels in each of said pairs of rail wheels to accommodate railway track gages of from 36 inches to 66 inches without necessitating structural modification of said main frame.

22. The vehicle of claim 12 wherein said power transmitting means includes a chain drive.

23. A rail traction vehicle of the type adapted for transferring weight from a coupled railcar to the traction vehicle comprising: a main frame having opposed side members, at least two pairs of road wheels mounted on said vehicle in generally rectangular configuration along axes generally transverse to said side members, at least two pairs of flanged rail wheels also mounted on said vehicle in generally rectangular configuration along axes generally parallel to but spaced from said road wheel axes, pivot arms supported by said frame for selectively and alternatively supporting said vehicle either wholly on the road wheels or wholly on the rail wheels, a single differential on said vehicle generally parallel to the axes of the road and rail wheels, a power train including an engine for driving said single differential, said differential including two opposed output shafts extending therefrom to opposite sides of said vehicle and terminating outwardly from the side members of the main frame, chain drive means operatively connected to said output shafts, said output shafts and said chain drive means being drivably connected to said two pairs of rail wheels and one pair of said road wheels, whereby the wheels on one side of the traction vehicle are differentially driven with respect to the wheels on the opposite side of said vehicle.

24. The vehicle defined in claim 23 wherein two weight transfer couplers are mounted on opposite ends of said vehicle.

25. The vehicle defined in claim 23 wherein said rail wheels have rail track engaging surfaces which are entirely formed of metal and the road wheels include tires of rubber-like material.

26. The vehicle of claim 23 wherein at least two of said pivot arms are each mounted to opposite sides of said vehicle in spaced apart relationship to each other.

27. The vehicle of claim 23 wherein one pair of said two pairs of rail wheels is mounted adjacent one end of said vehicle and the other pair of said two pairs of rail wheels is mounted adjacent the opposite end of said vehicle, and said two pairs of road wheels are both mounted to said vehicle between said two pairs of rail wheels.

28. The vehicle of claim 27 wherein two weight transfer couplers are mounted on opposite ends of said vehicle.

29. The vehicle of claim 23 wherein said rail wheels are mounted laterally exteriorly of said side members of said frame.

30. The vehicle of claim 23 wherein said rail wheels are mounted on stub axles.

31. The vehicle of claim 23 wherein each of said rail wheels is mounted on a stub axle and each of said pairs of rail wheels is respectively mounted on said vehicle in spaced relation from said main frame, said main frame being arranged and positioned to permit relocation of the respective rail wheels in each of said pairs of rail wheels to accommodate railway track gages of from 36 inches to 66 inches without necessitating structural modification of said main frame.

32. In a rail traction vehicle of the type adapted for transferring weight from a coupled railway car to the traction vehicle and including a main frame having opposed side members, an engine supported by said frame, at least two pairs of road wheels mounted on said vehicle in generally rectangular configuuration along axes generally transverse to said side members, at least two pairs of flanged rail wheels also mounted on said vehicle in generally rectangular configuration along axes generally parallel to but spaced from said road wheel axes, and means for selectively and alternatively supporting said vehicle either wholly on the road wheels or wholly on the rail wheels, the improvement comprising a single differential axle on the vehicle generally parallel to the axes of the road and rail wheels, said single differential axle being driven by said engine, and power transmitting means interconnecting said differential axle in driving relationship with said wheels for driving said two pairs of rail wheels and said one pair of road wheels, whereby the driven wheels on one side of the traction vehicle are differentially driven with respect to the driven wheels on the opposite side of said vehicle.

33. The improvement defined in claim 32 wherein two weight transfer couplers are mounted on opposite ends of said vehicle.

34. In a rail traction vehicle of the type adapted for transferring weight from a coupled railway car to the traction vehicle and including a main frame, an engine supported by said frame, a plurality of road wheels mounted on said vehicle, at least one pair of said road wheels being mounted along an axis which generally traverses said vehicle with the road wheels in said pair of road wheels being mounted in opposed relationship to each other on opposite sides of said vehicle, at least two pairs of flanged rail wheels also mounted on said vehicle along axes which are generally parallel to each other and with the rail wheels in each of said pairs of flanged rail wheels also being mounted in opposed relationship to each other on opposite sides of said vehicle, and means for selectively and alternatively supporting said vehicle either wholly on said road wheels or wholly on said rail wheels, the improvement comprising a single differential axle on the vehicle, said single differential axle being driven by said engine, and power transmitting means interconnecting said differential axle in driving relationship with said two pairs of rail wheels and said one pair of road wheels, whereby the respective opposed road and rail wheels in said pairs of wheels are differentially driven with respect to each other.

35. The improvement defined in claim 34 wherein two weight transfer couplers are mounted on opposite ends of said vehicle.

36. In a rail traction vehicle of the type adapted for transferring weight from a coupled railcar to the traction vehicle and including a main frame having opposed side members, an engine supported by said frame, at least two pairs of road wheels mounted on said vehicle in generally rectangular configuration along taxes generally transverse to said side members, and at least two pairs of flanged rail wheels also mounted on said vehicle in generally rectangular configuration along axes generally parallel to but spaced from said road wheel axes, the improvement comprising, pivot arms supported by said frame for selectively and alternatively supporting said vehicle either wholly on the road wheels or wholly on the rail wheels, a single differential on said vehicle generally parallel to the axes of the road and rail wheels, said differential being driven by said engine and including two opposed output shafts extending therefrom to opposite sides of said vehicle and terminating outwardly of said side members of the main frame, chain drive means operatively connected to said output shafts, said output shafts and said chain drive means being drivably connected to said two pairs of rail wheels and one pair of said road wheels, whereby the wheels on one side of the traction vehicle are differentially driven with respect to the wheels on the opposite side of said vehicle.

37. The improvement defined in claim 36 wherein two weight transfer couplers are mounted on opposite ends of said vehicle.

38. The improvement defined in claim 36 wherein said rail wheels have rail engaging surfaces which are entirely formed of metal and the road wheels include tires of rubber-like material.

39. The improvement defined in claim 36 wherein at least two of said pivot arms are each mounted to opposite sides of said vehicle in spaced apart relationship to each other.

40. The improvement defined in claim 36 wherein one each of said two pairs of rail wheels is mounted adjacent one end of said vehicle and the other pair of said two pairs of rail wheels is mounted adjacent the opposite end of said vehicle, and said two pairs of road wheels are both mounted to said vehicle between said two pairs of rail wheels.

41. A rail traction vehicle of the type adapted for transferring weight from a railcar coupled therewith to the traction vehicle comprising: a main frame having opposed side members, at least two pairs of road wheels mounted on said vehicle in generally rectangular configuration along axes generally transverse to said side members, at least two pairs of flanged rail wheels also mounted on said vehicle in generally rectangular configuration along axes generally parallel to but spaced from said road wheel axes, said rail wheels having rail track engaging surfaces which are entirely formed of metal and said road wheels including tires of rubber-like material, one pair of said two pairs of rail wheels being mounted adjacent one end of said vehicle and the other pair of said two pairs of said wheels being mounted adjacent the opposite end of said vehicle, said two pairs of road wheels being both mounted to said vehicle between said two pairs of rail wheels, with all of said road wheels being mounted on said vehicle between said pairs of rail wheels, two weight transfer couplers mounted to opposite ends of said vehicle, pivot arms supported by said frame for selectively and alternatively supporting said vehicle either exclusively on the road wheels or exclusively on the rail wheels, a single differential on said vehicle, said differential having output shafts extending therefrom along an axis generally parallel to the axes of the road and rail wheels, said output shafts extending from said differential to opposite sides of said vehicle and terminating outwardly from the side members of the main frame, a power train including an engine for driving said single differential, chain drive means operatively connected to said output shafts, said output shafts and chain drive means being drivably connected to said two pairs of rail wheels and one pair of road wheels, whereby the wheels on one side of the traction vehicle are differentially driven with respect to the wheels on the opposite sides of said vehicle.

42. The vehicle of claim 41 wherein at least two of said pivot arms are mounted to opposite sides of said vehicle in spaced relationship to each other.

* * * * *

UNITED STATES PATENT AND TRADEMARK OFFICE
CERTIFICATE OF CORRECTION

PATENT NO. : 3,892,187
DATED : July 1, 1975
INVENTOR(S) : Eugene B. White, Jr.

It is certified that error appears in the above-identified patent and that said Letters Patent are hereby corrected as shown below:

Column 11, line 27, "taxes" should read --axes--

Signed and Sealed this twenty-seventh Day of January 1976

[SEAL]

Attest:

RUTH C. MASON
*Attesting Officer*

C. MARSHALL DANN
*Commissioner of Patents and Trademarks*